United States Patent [19]

Nagy et al.

[11] Patent Number: 4,891,938
[45] Date of Patent: Jan. 9, 1990

[54] SOLID FUEL BURN ENHANCER

[75] Inventors: Joseph G. Nagy, St. Louis County; Daniel L. Jaspering, St. Charles, both of Mo.

[73] Assignee: The United States of America as represented by the Secretary of the Air Force, Washington, D.C.

[21] Appl. No.: 840,619

[22] Filed: Mar. 17, 1986

[51] Int. Cl.$^4$ ............................ F02K 9/12; F02K 9/28
[52] U.S. Cl. ........................ 60/245; 60/250; 60/254
[58] Field of Search ............ 60/245, 250, 253, 254, 60/270.1; 102/286, 287, 289, 291

[56] References Cited

U.S. PATENT DOCUMENTS

| | | | |
|---|---|---|---|
| 3,105,350 | 10/1963 | Eichenberger | 60/254 |
| 3,143,853 | 8/1964 | Sobey | 60/254 |
| 3,159,104 | 12/1964 | Hodgson | 102/98 |
| 3,283,510 | 11/1966 | Mangum et al. | 60/250 |
| 3,292,545 | 12/1966 | Matsubara | 102/289 |
| 3,357,187 | 12/1967 | Whitlock, Jr. | 60/250 |
| 3,656,304 | 4/1972 | McCullough | 60/254 |
| 3,718,095 | 2/1973 | Mungei et al. | 60/253 |
| 4,148,187 | 4/1979 | Younkin | 60/250 |

FOREIGN PATENT DOCUMENTS

| | | | |
|---|---|---|---|
| 1357255 | 2/1964 | France | 102/289 |
| 1220287 | 1/1971 | United Kingdom | 60/245 |

Primary Examiner—Louis J. Casaregola
Assistant Examiner—T. S. Thorpe
Attorney, Agent, or Firm—William G. Auton; Donald J. Singer

[57] ABSTRACT

A solid rocket motor grain construction is disclosed for use in a ramjet to improve performance. The solid fuel burn enhancer adds oxidizer for burn rate control. Two constructions are disclosed. The inlaid approach places cores of solid low-oxidizer fuel within solid unoxidized fuel and the integrated approach provides shells of low oxidizer around the solid unoxidized fuel. The low-oxidizer fuel has a faster burn rate and smaller burn area requirements than the unoxidized fuel. During initial ramjet operation, when the burn area is constrained, the low-oxidizer fuel burns initially with its smaller burn area requirements. Subsequently, the conventional unoxidized fuel burns when larger burn areas are available.

3 Claims, 2 Drawing Sheets

SOLID FUEL BURN ENHANCER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to solid fuel ramjet engines, and more specifically to a solid rocket motor construction which allows the burn rate to be controlled by variations in the oxidizer content.

In solid fuel ramjet engines, the burn rate characteristics of the solid fuel is a major determiner of the fuel flow rate. Generally, the fuel flow rate equals the product of: the burn rate, the burn area, and the fuel density.

Since the fuel density is fixed by the selection of the fuel, and the fuel flow rate is fixed by the initial requirements of the engine, the burn rate and burn area are inversely related. If the burn rate is low the burn area must be large.

It is common practice in the art to select fuels with low burn rates which allows a given amount of solid fuel to last longer. Since volumetrically efficient fuel grains are limited to small initial burn areas, a low burn rate often yields excessive burn area requirements until after some fuel is burned away. A technique to increase burn rate when the initial burn area is constrained, would greatly enhance the performance capabilities of the solid fuel ramjet.

The task of providing a variation in the fuel burn rates of solid fueled motors is alleviated, to some degree, by the techniques disclosed in the following U.S. Patents, which are incorporated herein by reference:

U.S. Pat. No. 3,159,104 issued to Hodgson;
U.S. Pat. No. 3,283,510 issued to Mangum et al; and
U.S. Pat. No. 3,656,304 issued to McCullough.

The references cited above propose combining a solid oxidizer with a solid fuel in a certain ratio to control the burn rate. The systems in these references each use a plurality of fuel and oxidizer grains separated by "inhibitors" to allow a type of "throttle" control. The reference Hodgson additionally shows use of a laminated structure of alternating layers of fuel and oxidizer.

While the references cited above are instructive, they do not describe ramjet engines. Current air-breathing missiles are typically as described in the U.S. Pat. No. 3,357,187 issued to Whitlock entitled "Ducted Rocket Motor", the disclosure of which is incorporated by reference. These ramjet systems include a solid rocket motor with oxidized booster propellants which accelerate the missile to ramjet velocities, typically between mach 3 and mach 8. At these velocities the unoxidized ramjet fuel is ignited in the ramjet chamber to propel the missile using oxygen obtained from the atmosphere.

From the foregoing discussion it is apparent that there remains a need to control the burn rate characteristics in solid fuel ramjet engines. The present invention is intended to satisfy that need.

SUMMARY OF THE INVENTION

The present invention is a solid rocket motor grain construction for use in a ramjet engine to improve performance. The ramjet engine of the present invention entails: a ducted housing; a core of booster propellant; a number of cores of unoxidized solid fuel; and a plurality of inlays of solid low-oxidizer fuel, each of which are placed around one of the cores of unoxidized solid fuel.

The ducted housing of the ramjet engine has an air intake manifold at one end and the exhaust nozzle at the other end. Within this ducted housing is the core of booster propellant which has a passage along its center axis. This booster propellant may be selected from any number of oxidized solid fuels known in the art, and it serves to boost the ramjet to operational velocities. Once operational velocities are attained, the cores of unoxidized solid fuel are ignited to propel the air-breathing missile using oxygen derived from the atmosphere.

The inlays of solid low-oxidizer fuel are placed around the solid unoxidized fuel in order to adjust the burn rate, as discussed below. In solid fueled ramjet engines, the burn rate characteristics determine the fuel flow rate. As mentioned above, the fuel flow rate equals the product of: the burn rate multiplied by the burn area and the fuel density.

Since the fuel density is fixed by the selection of the fuel, and the fuel flow rate is fixed by the initial requirements of the engine, the burn rate and burn area are inversely related. If the burn rate is low the burn area must be large.

At the beginning of the ramjet operation, the inlays of solid low-oxidizer fuel serve to initially increase the burn rate so that the required burn area is less when the initial burn area is constrained. The result is that this practice enables the average burn rate to be varied, depending upon the quantity of oxidizer added. A variety of unoxidized fuels are known in the art which may serve as the unoxidized fuel in the ramjet chamber. An example of a low-oxidized fuel is "ARC 425" which is produced by the Atlantic Research Corporation.

It is one object of the present invention to produce a ramjet engine with both the booster propellant and ramjet fuel in a single combustion chamber.

It is another object of the present invention to control the burn rate of the ramjet fuel so that the burn rate is appropriate to the burn area available in the combustion chamber.

It is another object of the present invention to vary the oxidizer content in ramjet fuels to vary the burn rate.

It is another object of the present invention to initially increase the burn rate of the solid fuel of a ramjet and later reduce the burn rate when a larger burn area is available.

These objects together with other objects, features and advantages of the invention will become more readily apparent from the following detailed description when taken in conjunction with the accompanying drawings wherein like elements are given like reference numerals throughout.

DESCRIPTION OF THE PREFERRED EMBODIMENT

The present invention is a solid rocket motor grain construction for use in a ramjet engine which allows the burn rate to be controlled.

In solid fuel ramjet engines the burn rate characteristics of the solid fuel is a major determiner of the fuel flow rate. More specifically, the relationship between the burn rate, burn area, and fuel flow rate is as expressed below in equation 1.

FUEL FLOW RATE (WF)=BURN RATE (RDOT)×BURN AREA (AB)×DENSITY (RHO)  (1)

As mentioned above, in most applications the fuel density is fixed by the selection of the fuel, and the fuel flow rate is fixed by the initial requirements of the engine. The remaining variables of equation 1 are the burn rate and the burn area, which are inversely related. If the burn rate is low, the burn area must be large.

Conventional ramjet engines are propelled by volumetrically efficient fuel grains which have low burn rates. However, during initial operation the burn areas are constrained since available space is packed with solid fuel. The design of the present invention is intended to vary the burn rate of the ramjet engine by increasing the burn rate initially, and reducing the burn rate as larger burn areas become available.

Figure 1:
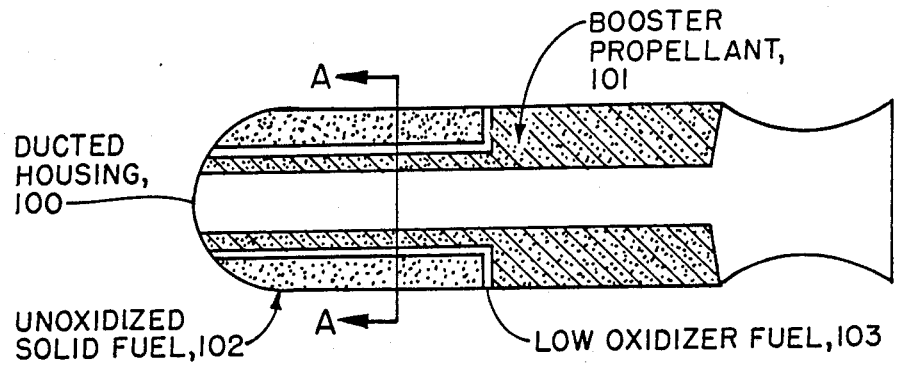
FIG. 1 is a side view of the ramjet construction of the present invention.

The reader's attention is now directed towards FIG. 1, which is a side view of the ramjet construction of the present invention. This ramjet is intended for use in an air-breathing missile and is composed of: a ducted housing 100, a core of booster propellant 101, a number of cores of unoxidized solid fuel 102, and a plurality of inlays of solid low-oxidizer fuel 103, each of which are placed around one of the cores of unoxidized solid fuel.

In operation, the booster propellant is ignited to accelerate the ramjet to operational velocities. This booster propellant is necessarily an oxidized solid fuel. Once operational velocities are attained, the cores of unoxidized solid fuel 102 are ignited to propel the ramjet using oxygen which enters the ducted housing 100 from the surrounding atmosphere.

The inlays of low oxidizer fuel 103 have a faster burn rate than the cores of unoxidized solid fuel 102. These inlays serve to increase the burn rate of the fuel during initial ramjet operation when the burn area is constrained by the presence of the bulk of the fuel. These inlays may be implemented in two design approaches: the inlaid design; and the integrated design. These designs are discussed separately below.

Figure 2:
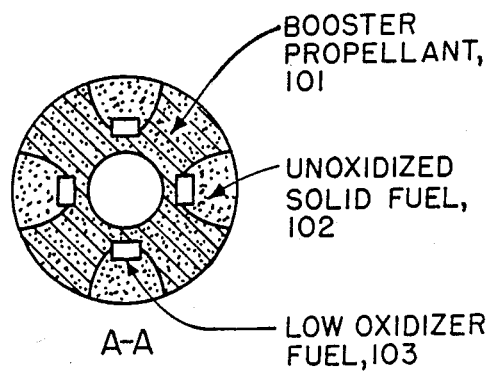
FIG. 2 is an A—A view of the ramjet construction of FIG. 1 when the inlaid design is used.

The reader's attention is now directed towards FIG. 2. FIG. 2 is an A—A view of the ramjet construction of FIG. 1 when the inlaid design is used. In FIG. 2, the inlays 103 are composed of separate cores of low-oxidizer fuel which are each placed between one of the cores of unoxidized solid fuel 102 and the central passage which runs along the axis of the ducted housing. The low-oxidizer fuel has a faster burn rate then the unoxidized fuels conventionally used. An example of an acceptable low-oxidizer fuel is "ARC 425" which is produced by the Atlantic Research Corporation.

Figure 3:
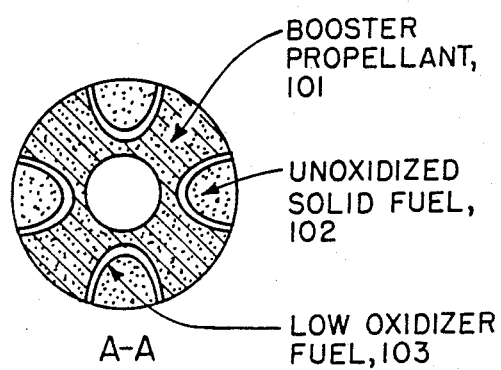
FIG. 3 is an A—A view of the ramjet construction of FIG. 1 when the integrated design is used.

The inlaid approach to FIG. 2 may be implemented as a "fix" to correct the burn rate characteristics of existing ramjet systems The "fix" is implemented when experience with an existing system indicates that the initial burn rate of the ramjet propellant 102 is inadequate. Correction is made by inserting a plurality of low-oxidizer fuel cores 103 between the unoxidized solid fuel cores 102 and the central passageway of the ramjet engine. The integrated approach of FIG. 3 is not a "fix" of an existing system, but rather a new design for a ramjet engine. FIG. 3 is an A—A view of the ramjet construction of FIG. 1 when the integrated design is used. In FIG. 3, the inlays 103 are composed of separate shells of solid low-oxidizer fuel which encompass the separate cores of unoxidized solid fuel 102 in the ramjet engine. The design of FIG. 3 is tailored to provide a transition between an initial higher burn rate, during ramjet operations, followed by a subsequent lower burn rate using conventional unoxidized solid fuel 102.

Figure 4:
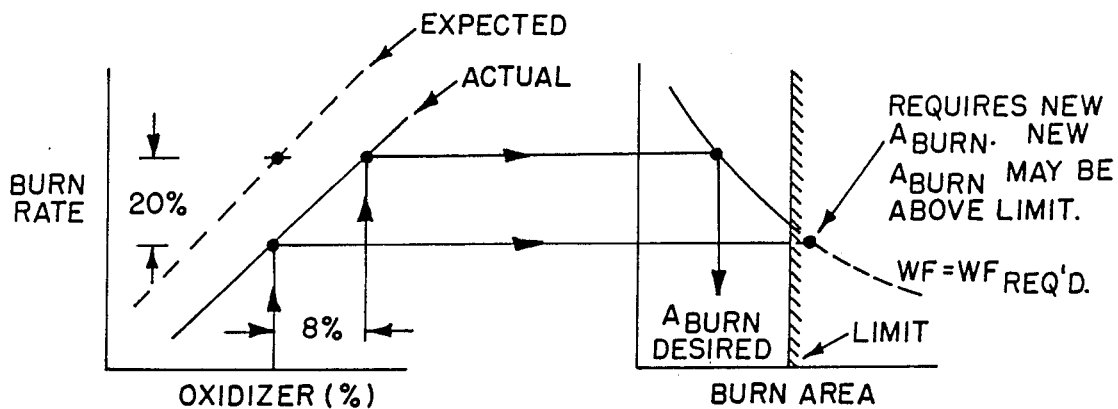
FIG. 4 is a chart indicating the design flexibility resulting from the solid fuel burn enhancer.
Figure 5:
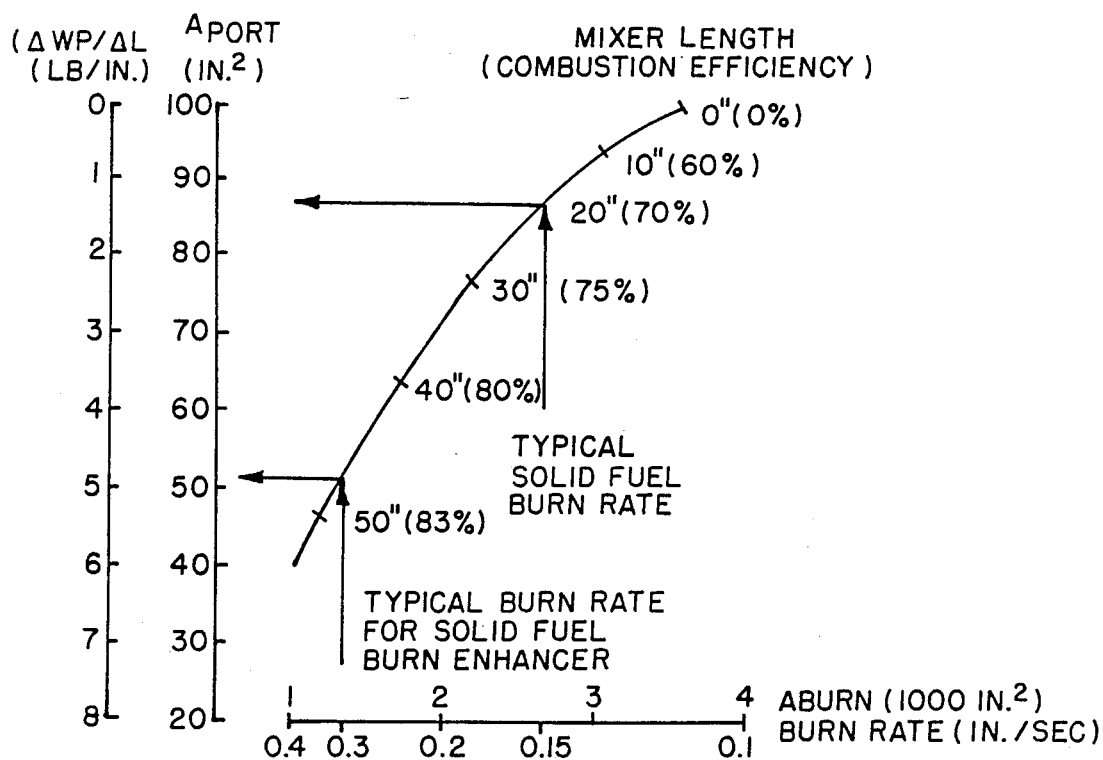
FIG. 5 is a chart depicting the solid fuel burn enhancer payoffs in ramjet engines.

FIG. 4 is a chart which shows the solid fuel burn enhancer can provide flexibility in burn rate to correct unexpected low burn rates measured during development tests. Consider the inlaid low oxidizer fuel (propellant) actually yielding a burn rate 20 percent below that desired. This would in turn result in 20 percent less fuel flow rate than required. Note that increasing the burn area 20 percent to reach the desired fuel flow rate would violate the burn area constraint for this grain. By increasing the oxidizer content of the inlaid low oxidizer fuel (propellant) by 8 percent the overall initial burn rate can be increased to the required value. Thus, the low burn rate can be corrected without having to re-design the grain. Solid fuel burn enhancer approach can also provide burn rates over that available from conventional solid fuels which can be translated into improved performance. For example, in FIG. 5 the low burn rate of the conventional solid fuel requires the burning area shown. This area can be provided by a grain with an air flow through port which is no smaller than the noted area. This limits the grain weight per inch to the value shown. By using the solid fuel burn enhancer the air flow through port area may be reduced, resulting in a significant improvement in grain weight per inch and potentially more loaded fuel. For the example, the fuel loading was held constant to show the other performance advantage of the solid fuel burn enhancer, that of a longer more efficient mixer length. The benefit in performance comes from greater range by virtue of the extra fuel on board or for fixed fuel loading from better propulsive efficiency at cruise due to a longer, more efficient mixer.

This technology can be applied to any solid fuel ramjet, engine or solid fuel ducted rocket engine. The approach can also encompass grain burn rate tailoring by using more than one layer of solid fuel burn enhancer. The solid fuel burn enhancer by virtue of its oxidizer can help the ignition of the conventional solid fuel.

The unique aspect of this approach is that solid fuel burn rate tailoring can be achieved through the use of a low oxidizer fuel (propellant). This avoids the cost or constraints of grain burn area tailoring in solid fuel ramjets.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A solid fuel ramjet engine comprising:

a ducted housing having an air intake manifold at one end, and an exhaust nozzle at the other end;

a core of booster propellant housed in said ducted housing said core of booster propellant being an oxidized solid fuel core with a central passageway along the axis of the ducted housing which allows combustion to propel the ramjet engine to operational velocities;

a plurality of cores of unoxidized solid fuel which are fixed in said ducted housing and circumscribe said core of booster propellant, said plurality of cores of unoxidized fuel burning at a low burn rate to propel said ramjet engine once it has attained operational velocities; and a plurality of inlays, each of which are embedded in said ducted housing between each of said cores of unoxidized solid fuel and said core of booster propellant, each of said inlays being composed of a low-oxidizer solid fuel which has a faster burn rate than that of the unoxidized solid fuel, said plurality of inlays thereby providing said ramjet engine with higher efficiency by having lower initial burn area requirements when said ramjet is operating at operational velocities, said ramjet engine subsequently burning with a lower burn rate when said inlays are consumed and said unoxidized solid fuel is being used.

2. A solid fuel ramjet engine, as defined in claim 1, where each of said plurality of inlays comprises a separate core of low-oxidizer solid fuel which is embedded between one of said cores of unoxidized solid fuel, and said core of booster propellant.

3. A solid fuel ramjet engine, as defined in claim 1, where each of said plurality of inlays comprises a separate shell of low-oxidizer fuel which surrounds one of the cores of unoxidized solid fuel, said separate shell thereby providing a transition in the burn rates of solid fuel during ramjet operations by burning at a comparatively fast rate during initial ramjet operations and, when consumed, leaving the unoxidized solid fuel to burn at a lower burn rate in a larger burn area.

* * * * *